(12) United States Patent
Huang

(10) Patent No.: US 6,362,748 B1
(45) Date of Patent: Mar. 26, 2002

(54) SYSTEM FOR COMMUNICATING AMONG VEHICLES AND A COMMUNICATION SYSTEM CONTROL CENTER

(75) Inventor: Lin-Hsiang Huang, Hsinchu (TW)

(73) Assignee: Lite Vision Corporation, Taipei (TW)

( * ) Notice: Subject to any disclaimer, the term of this patent is extended or adjusted under 35 U.S.C. 154(b) by 0 days.

(21) Appl. No.: 09/670,787

(22) Filed: Sep. 27, 2000

(51) Int. Cl.[7] .................................................. G08G 1/00
(52) U.S. Cl. .................... 340/901; 340/902; 340/903; 340/988; 340/989; 342/457; 701/207; 701/208; 701/202; 701/300; 455/445; 455/456; 455/459
(58) Field of Search ................................. 340/901, 902, 340/903, 988, 989; 342/457; 701/207, 202, 208, 300; 455/445, 456, 459

(56) References Cited

U.S. PATENT DOCUMENTS

| | | | | |
|---|---|---|---|---|
| 5,515,419 A | * | 5/1996 | Sheffer | 379/58 |
| 5,884,221 A | * | 3/1999 | Wortham | 701/300 |
| 6,009,330 A | * | 12/1999 | Kennedy, III et al. | 455/445 |
| 6,052,565 A | * | 4/2000 | Ishikura et al. | 455/67.1 |
| 6,094,618 A | * | 7/2000 | Harada | 701/207 |

* cited by examiner

Primary Examiner—Jeffery Hofsass
Assistant Examiner—Tai T. Nguyen
(74) Attorney, Agent, or Firm—Thorp Reed & Armstrong LLP

(57) ABSTRACT

The license plate number of a specific vehicle is related to a passcode that is built into a communications reception unit installed in the vehicle. When a driver enters a plate number of the vehicle having the communication reception unit installed, he can communicate with another vehicle. The communication reception unit can receive satellite positioning signals to provide more accurate coordinates to a control center, which can determine the position of the vehicle and send accurate, useful and relevant information to the vehicle.

17 Claims, 4 Drawing Sheets

SYSTEM FOR COMMUNICATING AMONG VEHICLES AND A COMMUNICATION SYSTEM CONTROL CENTER

BACKGROUND OF THE INVENTION

1. Field of Invention

The present invention relates to a system for communicating among vehicles and a communications system control center and, in particular, to a communications system among vehicles that enables the vehicles to communicate with each other and can connect with a control center.

2. Description of Related Art

The Global Positioning System (GPS) used in high-class sedans is a well-known technology. It uses a satellite reception module to simultaneously receive and decode signals sent to Earth from six satellites to generate a set of coordinates representing the position of the GPS receiver in the vehicle. These coordinates can be sent to a service center through a communication channel (such as a mobile phone network). Once the service center receives the coordinates, it can provide relevant traffic news, routes or other messages depending on the position of the vehicle and requirements of the user.

In spite of the fact that manufacturers keep emphasizing the superior capabilities of the GPS, actual use and implementation of GPS equipment is not as good as expected. The primary reason is that the GPS available to commercial customers does not have the precision of the system for military purposes. Therefore, the decoded coordinates converted from the satellite signals and received by the GPS reception module on the vehicle are not absolutely correct. The coordinates sent to the service center are thus incorrect. If the original coordinates sent from the vehicle are already incorrect for the reference of providing information from the service center, the vehicle owner can hardly obtain accurate reference messages. This is one of the drawbacks in the existing GPS used in private or commercial vehicles.

Furthermore, existing vehicle communication systems are used for the connection and signal transmission between a vehicle and the service center. With existing vehicle communication systems, there is no effective communications among vehicles. For example, a driver may notice a situation such as oil leakage or a flat tire on a vehicle whose owner has not realized the problem. Currently, it is extremely hard to notify the driver of another car of the situation while driving, even if one wants to.

SUMMARY OF THE INVENTION

In view of the foregoing, though the existing vehicle communication system possesses highly technological GPS, the actual effectiveness is not as good as it could be expected, and it does not support the communications among vehicles. Therefore, it is highly desirable to find an effective solution to the current problem.

It is thus a primary objective of the invention to provide a system for communicating among vehicles that enables moving vehicles to communicate with each other and can send accurate coordinates to a control center.

To achieve the foregoing objective, the technique uses a communication reception unit on a vehicle so that each vehicle having the unit can communicate with other vehicles having the unit and can establish connection with the control center. The communication reception unit comprises a processing unit, a signal reception unit and a mobile phone unit. The processing unit has multiple built-in passcodes that associate with different license plate numbers. The signal reception unit connects to the input terminal of the processing unit to receive more than two types of coordinate reference signals. The signal reception unit converts the coordinate reference signals to coordinates representing the position of the vehicle and sends the coordinates to the processing unit. The mobile phone unit connects to the processing unit to establish connectivity with the control center and other vehicles with the same communication devices. The converted coordinates are more accurate than the ones using the conventional GPS satellite signals since the signal reception unit receives at least two sets of coordinate reference signals the vehicle owner only needs to key in the license plate number of another vehicle equipped with the same communication devices into the processing unit and then a communication passcode will be generated to establish communication with the other party through the mobile phone unit. The built-in passcode in the processing unit can be the number of the mobile phone in the communications reception unit.

The processing unit comprises a microprocessor, means for communicating the microprocessor to the mobile phone unit by wires and means for communicating the microprocessor to the mobile phone unit by radio. The microprocessor communicates with the signal reception unit through an appropriate interface. The means of wire communication provides a wire connection between the microprocessor and the mobile phone unit. The means of wireless communication establishes a wireless connection between the processing unit and the mobile phone unit. The means of wire/wireless communication is achieved through a multitask processor and a microprocessor. The means of wireless communication can be a Bluetooth module. The means of wireless communication can be an infrared module.

The signal reception unit comprises a satellite signal reception module, a wireless signal reception module, a coordinate signal conversion module and a broadcasting module. The satellite signal reception module receives the satellite signals from the GPS. The wireless signal reception module receives the radio signals emitted from the RDS (Radio Data System). The coordinate signal conversion module converts the satellite signals and radio signals into a coordinate signal. The broadcasting module connects to the satellite/radio signal reception modules. The coordinate signal conversion module and broadcasting module connect to the satellite/radio signal reception modules through a multitask processor, and the coordinate signal conversion module and broadcasting module further connect to the processing unit through an appropriate interface.

Other features and advantages of the present invention will be apparent from the following detailed description with reference to the accompanying drawings.

DETAILED DESCRIPTION OF THE INVENTION

Figure 1:
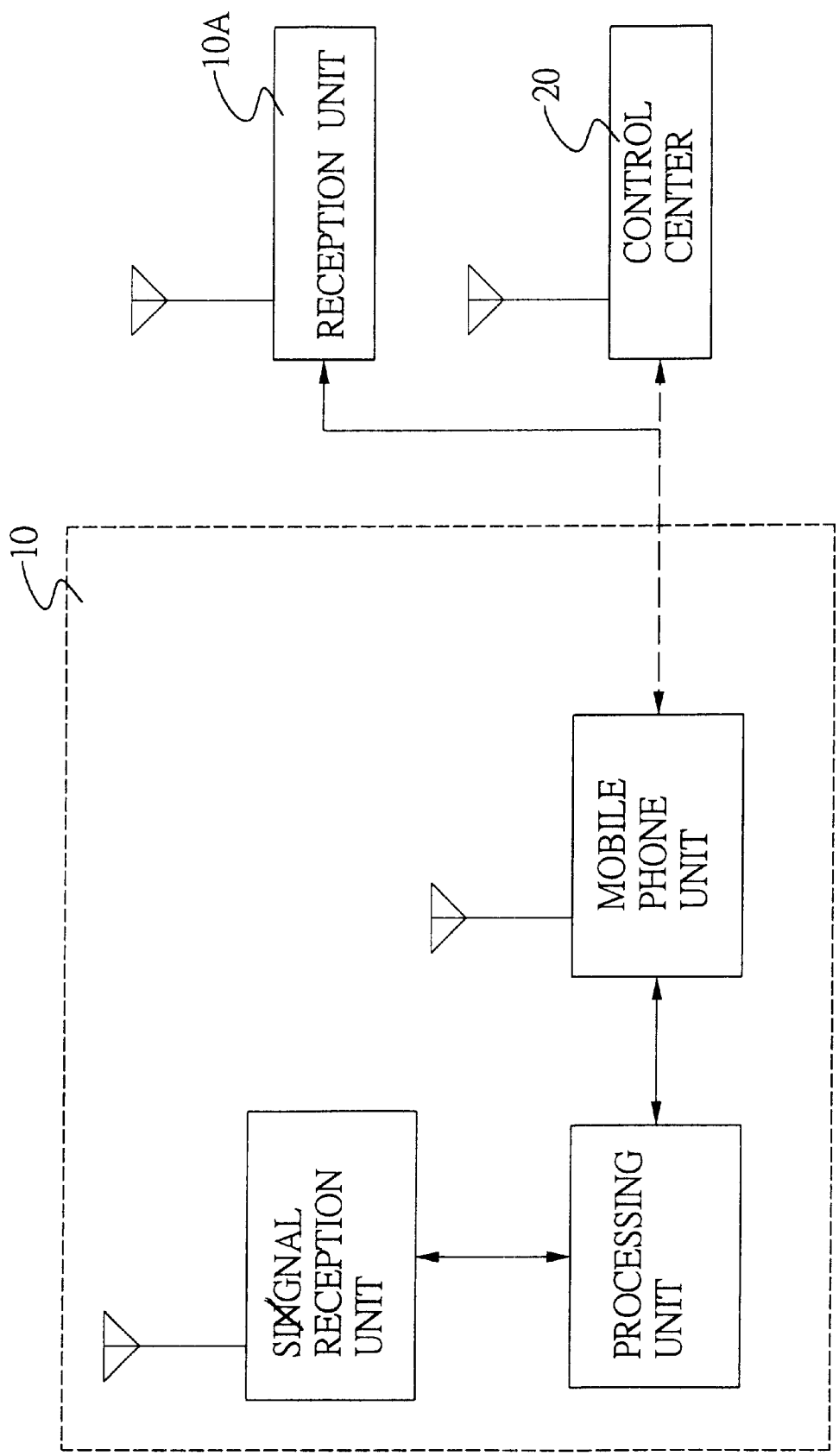
FIG. 1 is a block diagram of a communications system among vehicles in accordance with the present invention.

With reference to FIG. 1, in the communication system among vehicles in accordance with the present invention, a communication reception unit 10 is installed in a vehicle, through which one can establish communication with another vehicle that has a communication reception unit 10A installed and a control center 20. This enables communications among vehicles and can provide accurate coordinates to the control center 20 so the vehicles can obtain accurate services or reference information.

The communication reception unit 10 comprises a processing unit 11, a signal reception unit 12 and a mobile phone unit 13. The processing unit 11 has multiple built-in passcodes that correlate to different vehicle license plate numbers The signal reception unit 12 connects to the input terminal of the processing unit 11 to receive at Least two types of coordinate reference signals, convert them into the coordinates representing the position of the vehicle and send them to the processing unit 11 The mobile phone unit 13 connects to the processing unit 11 to establish communications between the control center 20 and the communications reception unit 10A installed in other vehicles to have duplex communications with the control center 20 and other vehicles.

Figure 2:
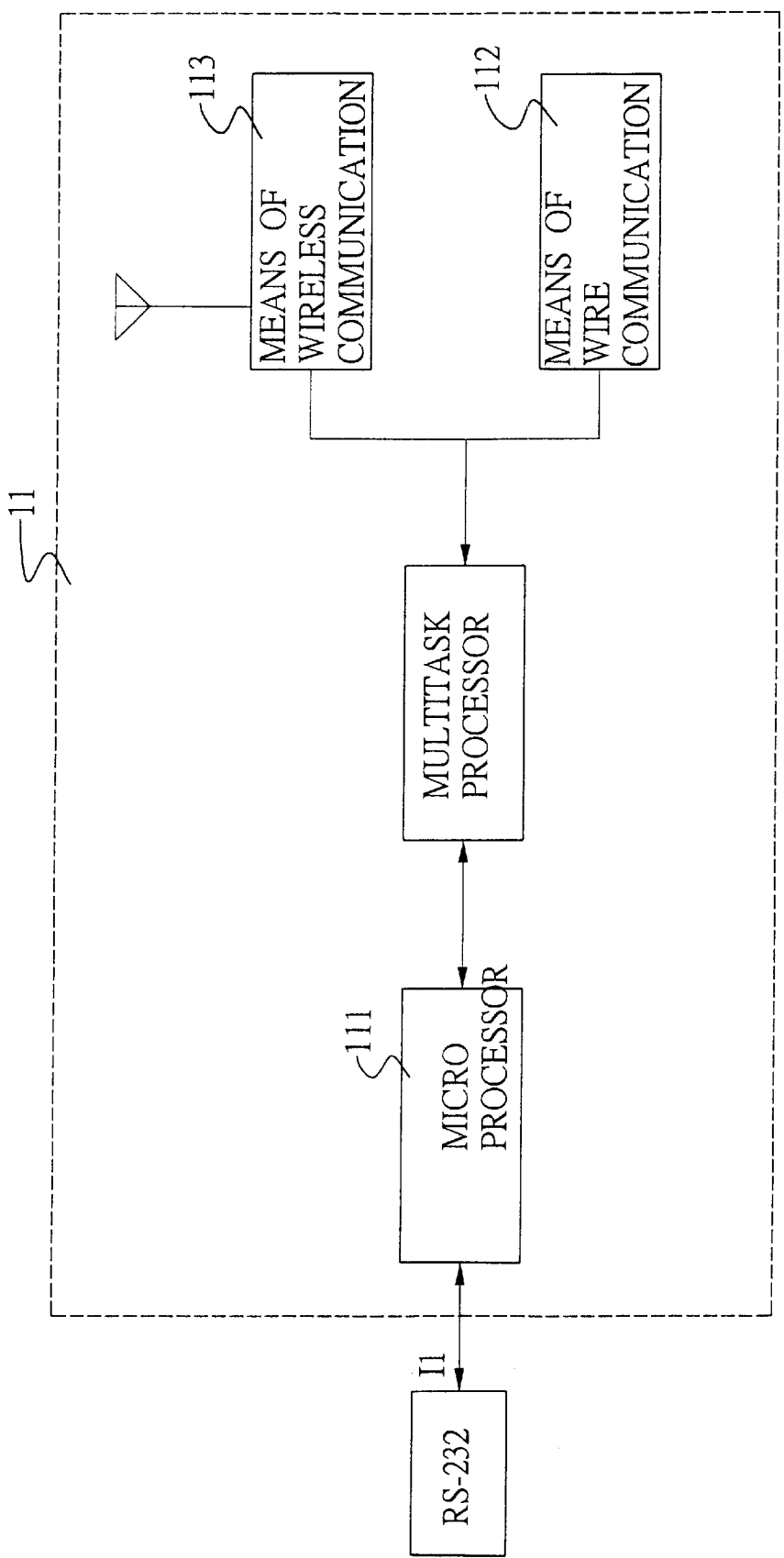
FIG. 2 is a block diagram of the processing unit in the communications system among vehicles in FIG. 1.

With reference to FIG. 2, the processing unit 11 comprises a microprocessor 111, a means of wire communications 112 and a means of wireless communications 113. The microprocessor 111 communicates with the signal reception unit 12 through an appropriate interface. The means of wire communications 112 provides a wire connection between the microprocessor 111 and the mobile phone unit 13. The means of wireless communications 113 provides a wireless connection between the microprocessor 111 and the mobile phone unit 13. The means of wire/wireless communications 112, 113 are achieved through a multitask processor 114 and a microprocessor 111.

The microprocessor 111 has multiple built-in passcodes that the correspond vehicle license plate numbers for communications with the communications reception unit 10A in another vehicle. More specifically, the passcode can be the number of the mobile phone unit 13 used in the communications reception unit 10 in a specific vehicle. This is set to be the default setting by the manufacturer and can be updated in a proper way.

The microprocessor 111 connects to the signal reception unit 12 through a standard computer RS-232 interface I1.

The means of wireless communications 113 widely refers to any communication means that uses radio signal transmission. In the current embodiment, the means of wireless communications 113 is a Bluetooth module.

Bluetooth is a wireless computer-based telecommunication technology developed by Ericsson Inc. The signal is transmitted over a 2.45 GHz bandwidth. The signals can be data or voice signals. Bluetooth can be used to establish one-to-one or multiple-point connections. The longest transmission distance is about 10 meters. Not only does it have a large and fast transmission rate (up to 1 MB/sec), but the transmitted signals can be encrypted and are free from electromagnetic interference.

Thus, the processing unit 11 communicates with the mobile phone unit 13 through the Bluetooth module. Other than that, the means of wireless communications 113 can be an infrared module.

Since the microprocessor 111 in the processing unit 11 connects to the mobile phone unit 13 simultaneously through two communication means, the microprocessor 111 utilizes the multitask processor 114 to process the communication means 112, 113.

Figure 3:
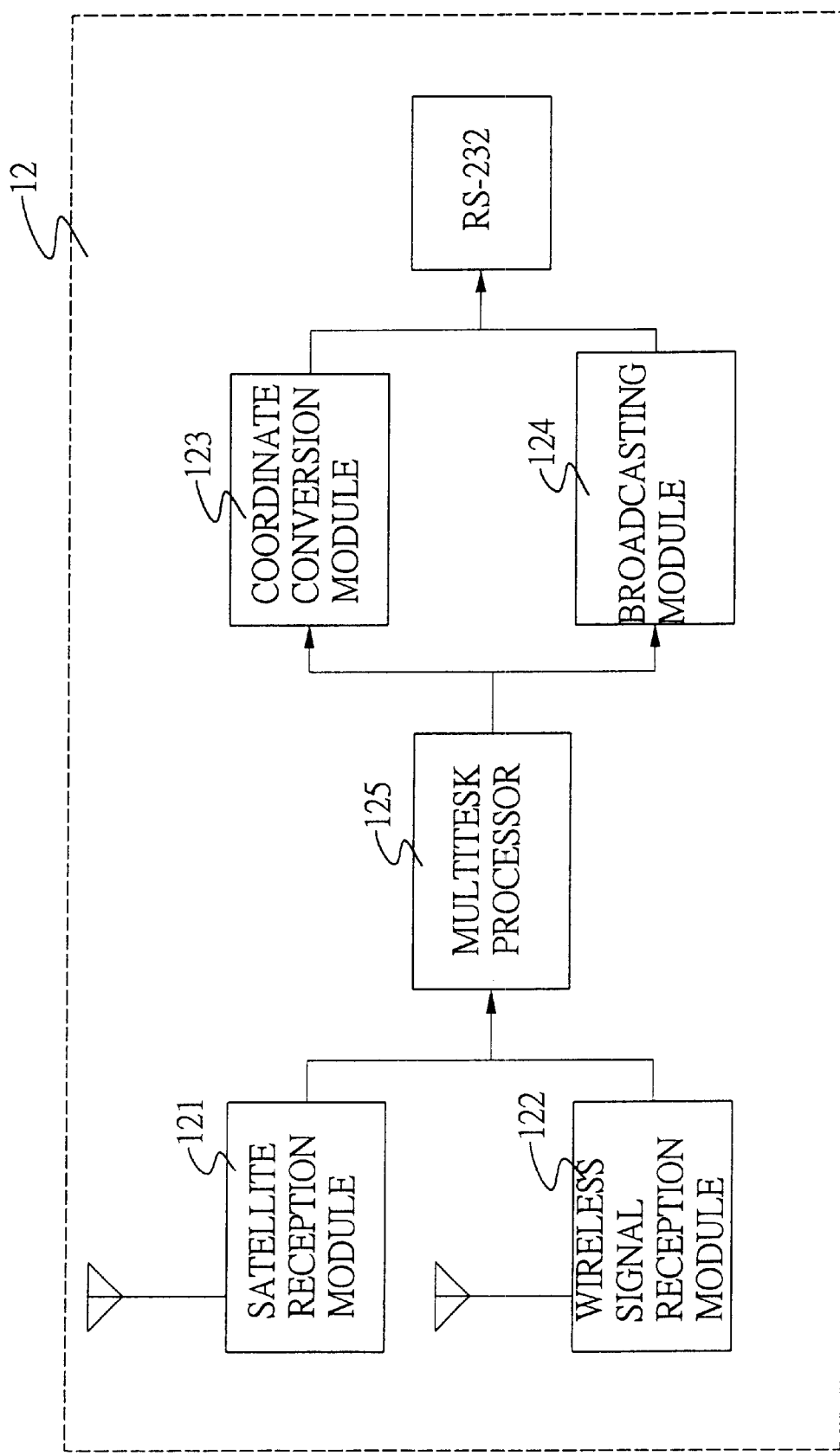
FIG. 3 is a block diagram of the signal reception unit in the communication system among vehicles in FIG. 1.

With reference to FIG. 3, the signal reception unit 12 comprises a satellite signal reception module 121, a wireless signal reception module 122, a coordinate signal conversion module 123 and a broadcasting module 124. The satellite signal reception module 121 receives signals from the GPS satellites. The radio signal reception module 122 receives the radio signals emitted from the RDS. The coordinate conversion module 123 converts the GPS satellite signals and radio signals into a set of coordinates. The broadcasting module 124 connects to the satellite/wireless signal reception modules 121, 122. The coordinate conversion module 123 and broadcasting module 124 connect to the satellite/wireless signal reception modules 121, 122 through a multitask processor 125.

The satellite signal reception module 121 is a conventional GPS satellite receiver and decoder and is not described.

Compared with existing positioning systems, the signal reception unit 12 has one more coordinate signal source, which is the radio signal reception module 122 113 for enhancing the precision of the coordinate signal. The reason is that the satellite signal reception module 121 receives commercial quality satellite signals and the radio signal from the control center simultaneously. Although six sets of satellite signals are received and decoded by the coordinate signal conversion module 123 to generate a set of coordinates, the commercial quality signal have an error of up to 100 meters. The radio signal reception module 122 receives radio signals sent from base stations on the ground, the error produced thereby is smaller due to the inherent accuracy of such systems. Therefore, the coordinates generated by the coordinate signal conversion module 123 based on the satellite signal reception module 121 and the radio signal reception module 122 can be effectively increased in precision.

The mobile phone unit 13 can be an existing mobile phone. To have communications with the processing unit 11 in the current embodiment, the mobile phone has to have a built-in Bluetooth module to perform short-distance wireless signal transmission.

Figure 4:
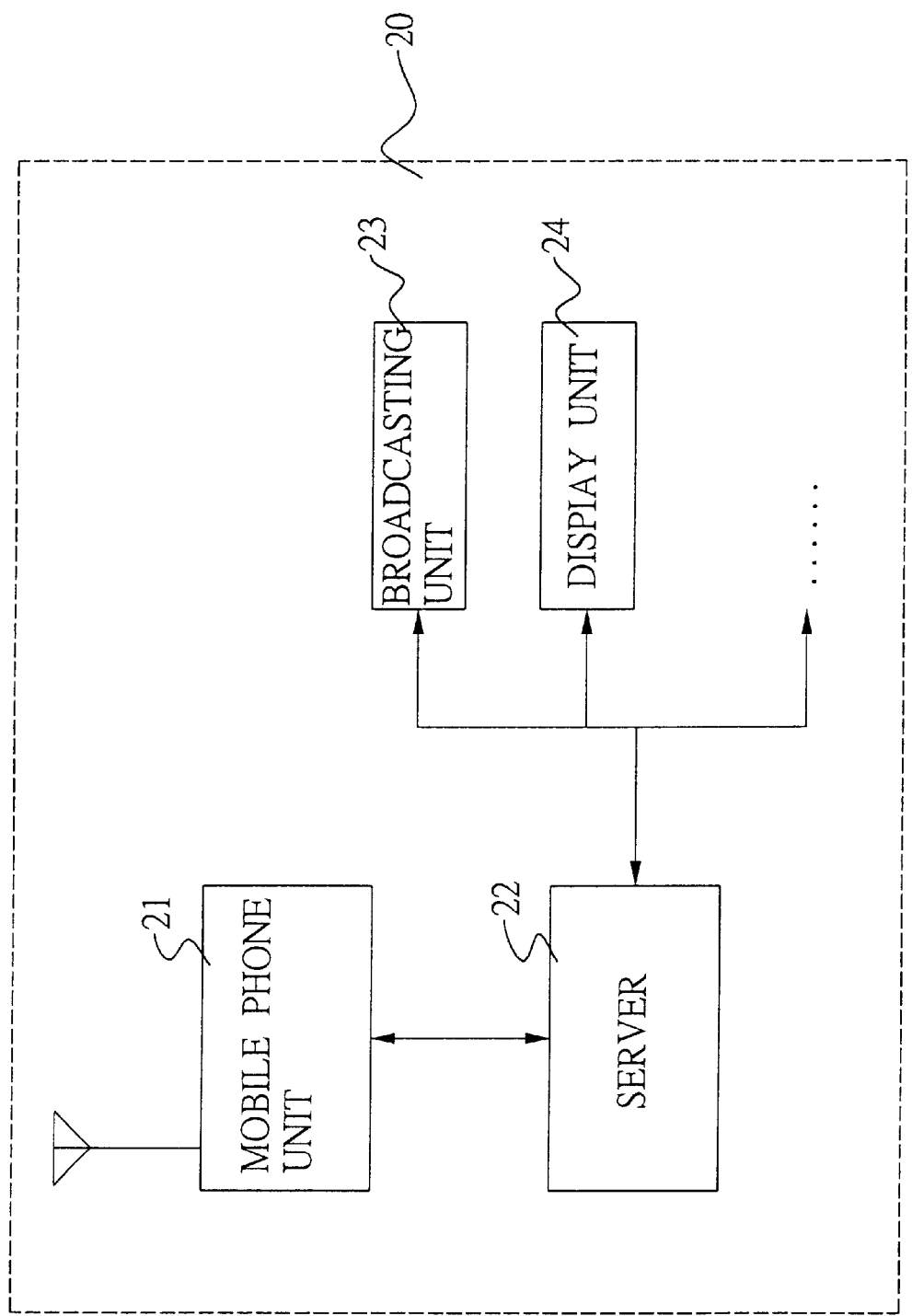
FIG. 4 is a block diagram of the control center in the communication system among vehicles in FIG. 1.

With reference to FIG. 4, the control center 20 connecting to the communications reception unit 10 comprises a mobile phone unit 21, a server 22, a broadcasting unit 23 and a display unit 24. The mobile phone unit 21 can communicate with each communications reception unit 10. The server 22 provides duplex communications with the mobile phone unit 21 and each communications reception unit 12. The broadcasting unit 23 connects to the server 22 to provide the broadcasting function. The display unit 24 can be a larger display connecting to the server 22 to display the position of the vehicles.

The foregoing system can operate in a number of modes. If a driver wants to communicate with a nearby vehicle driver, he only needs to key in the license plate number of the desired vehicle into the communications reception unit 10. If the other vehicle also has a communications reception unit 10A installed, its mobile phone unit number will correspond to the plate number and built into the processing unit 11 of all the communications reception units 10, 10A. Therefore, once the driver enters the plate number of the desired vehicle into the processing unit 11, the processing unit 11 will automatically call up the corresponding mobile phone number and establish the connection with the communications reception unit 10A of the other party through the mobile phone unit 13. The driver then has direct communications with the other driver to call for help, to coordinate or to notify of some situation that is occurring.

In the connection between the vehicle and the control center 20, the signal reception unit 12 of the communications reception unit 10 receives satellite and radio signals and converts them into a set of coordinates. Through the automatic dial-up by the processing unit 111 from the mobile phone unit 13 to the control center 20 via the mobile phone network, the coordinates are sent out and received by the mobile phone unit 21 of the control center 20. The signal is then sent to the server 22 for processing and the position of the vehicle is displayed on the display unit 23.

The server 22 can accept the requests made by the driver to provide such information services as relevant road news and route suggestions. The message is sent back to the communications reception unit 10 in the vehicle through the mobile phone network again. The mobile phone unit 13 in the communications reception unit 10 receives and displays (plays) the message accordingly.

Since the communications reception unit 10 includes a specially designed signal reception unit 12, a coordinate signal with a higher precision can be generated. The control center 20 can obtain accurate coordinate signals to provide more accurate services to vehicles.

In summary, the present invention achieves the goal of providing a system for communications among vehicles and a control center that can provide more accurate coordinates. Compared with conventional vehicle positioning systems, the invention can effectively solve the problem of large errors in the prior art and further provide communications among vehicles that had never been disclosed. It helps the communications between drivers when moving. Therefore, the invention possesses high industrial utility and novelty.

The invention being thus described, it should be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for communicating among vehicles and its control center, which requires a communications reception unit installed on each vehicle for the vehicles to perform communications with one another and with the control center; wherein the communications reception unit comprises a processing unit, which has multiple built-in passcodes that associate with different license plate numbers; a signal reception unit that connects to the input terminal of the processing unit to receive more than two types of coordinate reference signals, converting them into the coordinates representing the position of the vehicle and sending the coordinates to the processing unit; and a mobile phone unit that connects to the processing unit to establish communications with the control center and other vehicles with the same devices installed so as to have duplex communications with the control center and other vehicles.

2. The system for communicating among vehicles and its control center of claim 1, wherein the processing unit comprises a microprocessor that communicates with the signal reception unit through an appropriate interface; a means of wire communications that established a wire connection between the microprocessor and the mobile phone unit; and a means of radio communications that establishes a radio connection between the processing unit and the mobile phone unit.

3. The system for communicating among vehicles and its control center of claim 2, wherein the means of wire communications and the means of radio communications connect to the microprocessor through a multitask processor.

4. The system for communicating among vehicles and its control center of claim 2, wherein the means of radio communications is a Bluetooth module.

5. The system for communicating among vehicles and its control center of claim 2, wherein the means of radio communications is an infrared module.

6. The system for communicating among vehicles and its control center of claim 1 wherein the built-in passcode in the processing unit is the number of the mobile phone unit in the communications reception unit.

7. The system for communicating among vehicles and its control center of claim 1 wherein the signal reception unit comprises a satellite signal reception module, which receives the satellite signals from the GPS; a radio signal reception module, which receives the radio signals emitted from the RDS (Radio Data System); and a coordinate signal conversion module, which converts the satellite signals and radio signals into a set of coordinates.

8. The system for communicating among vehicles and its control center of claim 7, wherein the signal reception unit further comprises a broadcasting module connecting to the satellite/radio signal reception modules.

9. The system for communicating among vehicles and its control center of claim 8, wherein the coordinate signal conversion module and the broadcasting module connect to the satellite/radio signal reception modules through a multitask processor.

10. The system for communicating among vehicles and its control center of claim 8, wherein the coordinate signal conversion module and the broadcasting module connect to the processing unit through an appropriate interface.

11. The system for communicating among vehicles and its control center of claim 10, wherein the interface is a standard computer RS-232 interface.

12. The system for communicating among vehicles and its control center of claim 7, wherein the control center comprises a mobile phone unit, which communicates with each communications reception unit; and a server, which forms duplex communications with the mobile phone unit and each communications reception unit.

13. The system for communicating among vehicles and its control center of claim 12, wherein the control center further comprises a broadcasting unit connecting to the server.

14. The system for communicating among vehicles and its control center of claim 13, wherein the control center further comprises a display unit connecting to the server.

15. The system for communicating among vehicles and its control center of claim 1, wherein the control center comprises a mobile phone unit, which communicates with each communications reception unit; and a server, which forms duplex communications with the mobile phone unit and each communications reception unit.

16. The system for communicating among vehicles and its control center of claim 15, wherein the control center further comprises a broadcasting unit connecting to the server.

17. The system for communicating among vehicles and its control center of claim 16, wherein the control center further comprises a display unit connecting to the server.

* * * * *